United States Patent
Witham et al.

(10) Patent No.: US 10,941,347 B2
(45) Date of Patent: Mar. 9, 2021

(54) COMPOSITION FOR STEAM EXTRACTION OF BITUMEN

(71) Applicant: Dow Global Technologies LLC, Midland, MI (US)

(72) Inventors: Cole A. Witham, Pearland, TX (US); Yuko Kida, Houston, TX (US); Biplab Mukherjee, Pearland, TX (US); Timothy J. Young, Bay City, MI (US); Christopher W. Nelson, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 167 days.

(21) Appl. No.: 16/310,215

(22) PCT Filed: Jun. 16, 2017

(86) PCT No.: PCT/US2017/037893
§ 371 (c)(1),
(2) Date: Dec. 14, 2018

(87) PCT Pub. No.: WO2017/222929
PCT Pub. Date: Dec. 28, 2017

(65) Prior Publication Data
US 2019/0322944 A1    Oct. 24, 2019

Related U.S. Application Data

(60) Provisional application No. 62/431,499, filed on Dec. 8, 2016, provisional application No. 62/352,747, filed on Jun. 21, 2016.

(51) Int. Cl.
*C10G 1/04* (2006.01)
*C09K 8/584* (2006.01)
(Continued)

(52) U.S. Cl.
CPC .............. *C10G 1/045* (2013.01); *C09K 8/584* (2013.01); *C09K 8/592* (2013.01); *E21B 43/24* (2013.01);
(Continued)

(58) Field of Classification Search
None
See application file for complete search history.

(56) References Cited

U.S. PATENT DOCUMENTS 3,410,344 A    11/1968   Cornelius
3,454,095 A     7/1969   Messenger et al.
(Continued)

FOREIGN PATENT DOCUMENTS

WO    2015143034    9/2015
WO    2015148296    10/2015

OTHER PUBLICATIONS

Masliyah, J., et. al., "Understanding Water-Based Bitumen Extraction from Athabasca Oil Sands", Canadian Journal of Chemical Engineering, 2004, p. 628-654, v. 82.
(Continued)

*Primary Examiner* — John J Figueroa

(57) ABSTRACT

The present invention relates to a bitumen recovery process from oil sands. The oil sands may be surface mined and transported to a treatment area or may be treated directly by means of an in situ process of oil sand deposits that are located too deep for strip mining. Specifically, the present invention involves the step of treating oil sands with a composition comprising an alkanolamine and an ethylene oxide capped glycol ether and/or propylene oxide capped glycol ether.

10 Claims, 1 Drawing Sheet

(51) Int. Cl.
  *C09K 8/592* (2006.01)
  *E21B 43/24* (2006.01)
  *E21C 41/26* (2006.01)

(52) U.S. Cl.
  CPC .......... *E21C 41/31* (2013.01); *C10G 2300/80* (2013.01); *E21B 43/2406* (2013.01)

(56) References Cited

U.S. PATENT DOCUMENTS

| | | |
|---|---|---|
| 3,500,920 A | 3/1970 | Raifsnider |
| 3,692,125 A | 9/1972 | Ruhle |
| 3,782,472 A | 1/1974 | Siess, Jr. |
| 3,890,239 A | 6/1975 | Dycus et al. |
| 3,902,557 A | 9/1975 | Shaughnessy et al. |
| 3,993,133 A | 11/1976 | Clampitt |
| 3,994,345 A | 11/1976 | Needham |
| 4,175,618 A | 11/1979 | Wu et al. |
| 4,216,828 A | 8/1980 | Blair, Jr. |
| 4,522,732 A | 6/1985 | Purcell et al. |
| 4,664,563 A * | 5/1987 | Christman .......... C08G 18/5033 405/288 |
| 4,814,094 A | 3/1989 | Blair, Jr. et al. |
| 4,968,412 A | 11/1990 | Guymon |
| 5,092,405 A | 3/1992 | Prukop |
| 5,110,487 A | 5/1992 | Current |
| 5,169,518 A | 12/1992 | Klimpel et al. |
| 6,305,472 B2 | 10/2001 | Richardson et al. |
| 7,770,643 B2 | 8/2010 | Daussin |
| 2006/0276345 A1 | 12/2006 | Todd et al. |
| 2007/0284110 A1 | 12/2007 | Harris et al. |
| 2008/0139418 A1* | 6/2008 | Cioletti .................. C10G 1/04 507/261 |
| 2009/0078414 A1 | 3/2009 | Horvath Szabo et al. |
| 2012/0103635 A1 | 5/2012 | Sanders et al. |
| 2013/0081808 A1 | 4/2013 | Zeidani et al. |

OTHER PUBLICATIONS

Lebedeva, N. N., et. al., "Synthesis of Glycol Ethers and Their Use for Intensification of Oil Recovery," Russian Journal of Applied Chemistry, v. 74, No. 8, 2001, p. 1415-1417.

Handy, L. L., et. al., "Thermal Stability of Surfactants for Reservoir Application," 1982, Society of Petroleum Engineers Journal, p. 722-730.

El-Abbas, A.A., "Experimental Investigation of the Feasibility of Steam/Chemical Steam Flooding Processes through Horizontal Wells", Egyptian Petroleum Research Institute, Society of Petroleum Engineers of AIME, 2001.

Adkins, J.D., "Field Results of Adding Surfactant to Cyclic Steam Wells," Society of Petroleum Engineers of AIME, 1983.

* cited by examiner

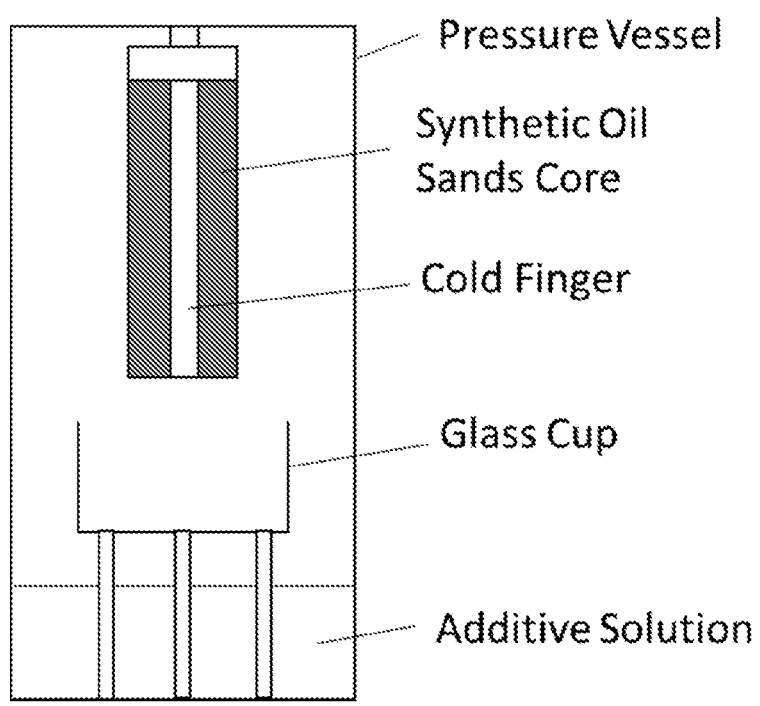

COMPOSITION FOR STEAM EXTRACTION OF BITUMEN

FIELD OF THE INVENTION

The present invention relates to the recovery of bitumen from oil sands. More particularly, the present invention is an improved method for bitumen recovery from oil sands through either surface mining or in situ recovery. The improvement is the use of a composition comprising an alkanolamine and an ethylene oxide capped glycol ether and/or a propylene oxide capped glycol ether as an extraction aid in the water and/or steam used in the bitumen recovery process.

BACKGROUND OF THE INVENTION

Deposits of oil sands are found around the world, but most prominently in Canada, Venezuela, and the United States. These oil sands contain significant deposits of heavy oil, typically referred to as bitumen. The bitumen from these oil sands may be extracted and refined into synthetic oil or directly into petroleum products. The difficulty with bitumen lies in that it typically is very viscous, sometimes to the point of being more solid than liquid. Thus, bitumen typically does not flow as less viscous, or lighter, crude oils do.

Because of the viscous nature of bitumen, it cannot be produced from a well drilled into the oil sands as is the case with lighter crude oil. This is so because the bitumen simply does not flow without being first heated, diluted, and/or upgraded. Since normal oil drilling practices are inadequate to produce bitumen, several methods have been developed over several decades to extract and process oil sands to remove the bitumen. For shallow deposits of oil sands, a typical method includes surface extraction, or mining, followed by subsequent treatment of the oil sands to remove the bitumen.

The development of surface extraction processes has occurred most extensively in the Athabasca field of Canada. In these processes, the oil sands are mined, typically through strip or open pit mining with draglines, bucket-wheel excavators, and, more recently, shovel and truck operations. The oil sands are then transported to a facility to process and remove the bitumen from the sands. These processes typically involve a solvent of some type, most often water or steam, although other solvents, such as hydrocarbon solvents, have been used.

After excavation, a hot water extraction process is typically used in the Athabasca field in which the oil sands are mixed with water at temperatures ranging from approximately 35° C. to 75° C., with recent improvements lowering the temperature necessary to the lower portion of the range. An extraction agent, such as sodium hydroxide (NaOH), surfactants, and/or air may be mixed with the oil sands.

Water is added to the oil sands to create an oil sands slurry, to which additives such as NaOH may be added, which is then transported to an extraction plant, typically via a pipeline. Inside a separation vessel, the slurry is agitated and the water and NaOH releases the bitumen from the oil sands. Air entrained with the water and NaOH attaches to the bitumen, allowing it to float to the top of the slurry mixture and create a froth. The bitumen froth is further treated to remove residual water and fines, which are typically small sand and clay particles. The bitumen is then either stored for further treatment or immediately treated, either chemically or mixed with lighter petroleum products, and transported by pipeline for upgrading into synthetic crude oil. Unfortunately, this method cannot be used for deeper tar sand layers. In situ techniques are necessary to recover deeper oil in well production. It is estimated that around 80 percent of the Alberta tar sands and almost all of the Venezuelan tar sands are too far below the surface to use open pit mining.

In well production, referred to as in situ recovery, Cyclic Steam Stimulation (CSS) is the conventional "huff and puff" in situ method whereby steam is injected into the well at a temperature of 250° C. to 400° C. The steam rises and heats the bitumen, decreasing its viscosity. The well is allowed to sit for days or weeks, and then hot oil mixed with condensed steam is pumped out for a period of weeks or months. The process is then repeated. Unfortunately, the "huff and puff" method requires the site to be shut down for weeks to allow pumpable oil to accumulate. In addition to the high cost to inject steam, the CSS method typically results in 20 to 25 percent recovery of the available oil.

Steam Assisted Gravity Drainage (SAGD) is another in situ method where two horizontal wells are drilled in the tar sands, one at the bottom of the formation and another five meters above it. The wells are drilled in groups off of central pads. These wells may extend for miles in all directions. Steam is injected into the upper well, thereby melting the bitumen which then flows into the lower well. The resulting liquid oil mixed with condensed steam is subsequently pumped to the surface. Typical recovery of the available oil is 40 to 60 percent.

The above methods have many costs, as well as environmental and safety problems associated with them. For example, the use of large amounts of steam is energy intensive and requires the processing and disposal of large amounts of water. Currently, tar sands extraction and processing requires several barrels of water for each barrel of oil produced. Strip mining and further treatment results in incompletely cleaned sand, which requires further processing, before it can be returned to the environment. Further, the use of a large quantity of caustic in surface mining not only presents process safety hazards but also contributes formation of fine clay particles in tailings, the disposal of which is a major environmental problem.

Thus, there remains a need for efficient, safe and cost-effective methods to improve the recovery of bitumen from oil sands.

SUMMARY OF THE INVENTION

The present invention is an improved bitumen recovery process comprising the step of treating oil sands with a composition comprising (i) an alkanolamine and (ii) a glycol ether wherein the treatment is to oil sands recovered by surface mining or in situ production to oil sands in a subterranean reservoir.

In one embodiment of the bitumen recovery process described herein above, the alkanolamine (i) of the present invention is represented by the following formula:

$$R_1R_2N\text{—}R_3OH \qquad \qquad I$$

where $R_1$ is H, or a linear, branched, or cyclic alkyl group of 1 to 4 carbons, preferably methyl or ethyl, $R_2$ is H, —$CH_2CH_2OH$, —$CH_2CH(CH_3)OH$, or a linear, branched, or cyclic alkyl group of 1 to 4 carbons, preferably H, —$CH_2CH_2OH$, methyl, or ethyl, and $R_3$ is a linear or branched alkyl group of 2 to 5 carbons, preferably —$CH_2CH_2$—, —$CH_2CH_2CH_2$—, —$CH_2CH(CH_3)$—. Preferably the alkanolamine is monoethanolamine, monoisopropanolamine, N-methymonoethanolamine, 3-amino-1-propanol, or mixtures thereof. Preferably the alkanolamine is present in the composition in an amount of 10 to 90 weight percent.

And, the glycol ether (ii) is selected from: (a) an ethylene oxide capped glycol ether described by the following structure:

$$RO-(CH_2CH(CH_3)O)_m(C_2H_4O)_nH \quad\quad II$$

wherein R is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, m is equal to 0 to 3, preferably 1 to 2, and n is 1 to 3, preferably 1 or 2, more preferably m+n is 2, preferably the ethylene capped glycol ether is one of, or a combination thereof, ethylene oxide capped n-butyl ether of propylene glycol, ethylene oxide capped n-hexyl ether of propylene glycol, or ethylene oxide capped 2-ethylhexyl ether of propylene glycol, and/or (b) a propylene oxide capped glycol ether is described by the structure:

$$RO-(C_2H_4O)_o(CH_2CH(CH_3)O)_pH \quad\quad III$$

wherein is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, o is 0 to 3, preferably 1 or 2, and p is 1 to 3, preferably 1 or 2, preferably o+p is 2, preferably the propylene capped glycol ether is one of, or a combination thereof, propylene oxide capped n-butyl ether, propylene oxide capped n-butyl ether of ethylene glycol, propylene oxide capped n-hexyl ether, propylene oxide capped n-hexyl ether of ethylene glycol, propylene oxide capped 2-ethylhexyl ether, or propylene oxide capped 2-ethylhexyl ether of ethylene glycol, preferably the ethylene oxide capped glycol ether and/or propylene oxide capped glycol ether is present in the composition in an amount of 90 to 10 weight percent based on the combined weights of the alkanolamine and the ethylene oxide capped glycol ether and/or propylene oxide capped glycol ether.

In one embodiment of the bitumen recovery process described herein above, the weight ratio of the alkanolamine to glycol ether is 50:50.

In another embodiment of the present invention, the bitumen recovery process by surface mining described herein above comprises the steps of: i) surface mining oil sands, ii) preparing an aqueous slurry of the oil sands, iii) treating the aqueous slurry with the alkanolamine and ethylene oxide capped glycol ether and/or a propylene oxide capped glycol ether composition, iv) agitating the treated aqueous slurry, v) transferring the agitated treated aqueous slurry to a separation tank, and vi) separating the bitumen from the aqueous portion, preferably the ethylene oxide capped glycol ether and/or propylene oxide capped glycol ether is present in the aqueous slurry in an amount of from 0.01 to 10 weight percent based on the weight of the oil sands.

In another embodiment of the present invention, the bitumen recovery process by in situ production described herein above comprises the steps of: i) treating a subterranean reservoir of oil sands by injecting steam containing the alkanolamine and ethylene oxide capped glycol ether and/or a propylene oxide capped glycol ether composition into a well, and ii) recovering the bitumen from the well, preferably the concentration of the ethylene oxide capped glycol ether and/or propylene oxide capped glycol ether in the steam is in an amount of from 0.01 to 10 weight percent.

BRIEF DESCRIPTION OF THE DRAWINGS

FIG. 1 is a schematic of the experimental apparatus used in the examples.

DETAILED DESCRIPTION OF THE EMBODIMENTS

The separation of bitumen and/or heavy oil from oil sands is accomplished by, but not limited to, two methods; surface mining or in situ recovery sometimes referred to as well production. The oil sands may be recovered by surface or strip mining and transported to a treatment area. A good summary can be found in the article "Understanding Water-Based Bitumen Extraction from Athabasca Oil Sands", J. Masliyah, et al., *Canadian Journal of Chemical Engineering*, Volume 82, August 2004. The basic steps in bitumen recovery via surface mining include: extraction, froth treatment, tailings treatment, and upgrading. The steps are interrelated; the mining operation affects the extraction and in turn the extraction affects the upgrading operation.

Typically, in commercial bitumen recovery operations, the oil sand is mined in an open-pit mine using trucks and shovels. The mined oil sands are transported to a treatment area. The extraction step includes crushing the oil sand lumps and mixing them with (recycle process) water in mixing boxes, stirred tanks, cyclo-feeders or rotary breakers to form conditioned oil sands slurry. The conditioned oil sands slurry is introduced to hydrotransport pipelines or to tumblers, where the oil sand lumps are sheared and size reduction takes place. Within the tumblers and/or the hydrotransport pipelines, bitumen is recovered or "released', or "liberated", from the sand grains. Chemical additives can be added during the slurry preparation stage; for examples of chemicals known in the art see US2008/0139418, incorporated by reference herein in its entirety. In typical operations, the operating slurry temperature ranges from 35° C. to 75° C., preferably 40° C. to 55° C.

Entrained or introduced air attaches to bitumen in the tumblers and hydrotransport pipelines creating froth. In the froth treatment step, the aerated bitumen floats and is subsequently skimmed off from the slurry. This is accomplished in large gravity separation vessels, normally referred to as primary separation vessels (PSV), separation cells (Sep Cell) or primary separation cells (PSC). Small amounts of bitumen droplets (usually un-aerated bitumen) remaining in the slurry are further recovered using either induced air flotation in mechanical flotation cells and tailings oil recovery vessels, or cyclo-separators and hydrocyclones. Generally, overall bitumen recovery in commercial operations is about 88 to 95 percent of the original oil in place. The recovered bitumen in the form of froth normally contains 60 percent bitumen, 30 percent water and 10 percent solids.

The bitumen froth recovered as such is then de-aerated, and diluted (mixed) with solvents to provide sufficient density difference between water and bitumen and to reduce the bitumen viscosity. The dilution by a solvent (e.g., naphtha or hexane) facilitates the removal of the solids and water from the bitumen froth using inclined plate settlers, cyclones and/or centrifuges. When a paraffinic diluent (solvent) is used at a sufficiently high diluent to bitumen ratio, partial precipitation of asphaltenes occurs. This leads to the formation of composite aggregates that trap the water and solids in the diluted bitumen froth. In this way gravity separation is greatly enhanced, potentially eliminating the need for cyclones or centrifuges.

In the tailings treatment step, the tailings stream from the extraction plant goes to the tailings pond for solid-liquid separation. The clarified water is recycled from the pond back to the extraction plant. To accelerate tailings handling, gypsum may be added to mature fine tailings to consolidate the fines together with the coarse sand into a non-segregating mixture. This method is referred to as the consolidated (composite) tailing (CT) process. CT is disposed of in a geotechnical manner that enhances its further dewatering and eventual reclamation. Optionally, tailings from the extraction plant are cycloned, with the overflow (fine tailings) being pumped to thickeners and the cyclone underflow (coarse tailings) to the tailings pond. Fine tailings are treated with flocculants, then thickened and pumped to a tailings pond. Further, the use of paste technology (addition of flocculants/polyelectrolytes) or a combination of CT and paste technology may be used for fast water release and recycle of the water in CT to the extraction plant for bitumen recovery from oil sands.

In the final step, the recovered bitumen is upgraded. Upgrading either adds hydrogen or removes carbon in order to achieve a balanced, lighter hydrocarbon that is more valuable and easier to refine. The upgrading process also removes contaminants such as heavy metals, salts, oxygen, nitrogen and sulfur. The upgrading process includes one or more steps such as: distillation wherein various compounds are separated by physical properties, coking, hydro-conversion, solvent deasphalting to improve the hydrogen to carbon ratio, and hydrotreating which removes contaminants such as sulfur.

In one embodiment of the present invention, the improvement to the process of recovering bitumen from oil sands is contacting the oil sands containing the bitumen with a composition comprising, consisting essentially of, or consisting of (i) an alkanolamine and (ii) a glycol ether, preferably an ethylene oxide capped glycol ether (ii)(a) and/or propylene oxide capped glycol ether (ii)(b).

Preferred alkanolamines (i) of the present invention are represented by the following formula:

      I where $R_1$ is H, or a linear, branched, or cyclic alkyl group of 1 to 4 carbons, preferably methyl or ethyl, $R_2$ is H, —$CH_2CH_2OH$, —$CH_2CH(CH_3)OH$, or a linear, branched, or cyclic alkyl group of 1 to 4 carbons, preferably H, —$CH_2CH_2OH$, —$CH_2CH(CH_3)OH$, methyl, or ethyl, and $R_3$ is a linear or branched alkyl group of 2 to 5 carbons, preferably —$CH_2CH_2$—, —$CH_2CH_2CH_2$—, —$CH_2CH(CH_3)$—. Preferably the alkanolamine is monoethanolamine, monoisopropanolamine, N-methymonoethanolamine, 3-amino-1-propanol, or mixtures thereof.

The alkanolamine (i) is present in the composition of the present invention in an amount equal to or greater than 10 weight percent, preferably equal to or greater than 20 weight percent, preferably equal to or greater than 30 weight percent, preferably equal to or greater than 40 weight percent, preferably equal to or greater than 50 weight percent based on the combined weights of the alkanolamine (i) and the glycol ether (ii).

The alkanolamine (i) is present in the composition of the present invention in an amount equal to or less than 90 weight percent, preferably equal to or less than 80 weight percent, preferably equal to or less than 70 weight percent, preferably equal to or less than 60 weight percent, preferably equal to or less than 50 weight percent based on the combined weights of the alkanolamine (i) and the glycol ether (ii).

In one embodiment of the present invention, the glycol ether is an ethylene oxide capped glycol ethers (ii)(a) of the present invention are represented by the following formula:

$$RO\text{—}(CH_2CH(CH_3)O)_m(C_2H_4O)_nH \qquad \text{II}$$

wherein R is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, m is 0 to 3, preferably 1 or 2, and n are independently 1 to 3, preferably 1 or 2, preferably m+n is 2.

In another embodiment of the present invention, the glycol ether is a propylene oxide capped glycol ethers (ii)(b) of the present invention are represented by the following formulas:

$$RO\text{—}(C_2H_4O)_o(CH_2CH(CH_3)O)_pH \qquad \text{III}$$

wherein is a linear, branched, cyclic alkyl, phenyl, or alkyl phenyl group of equal to or greater than 4 carbons, preferably n-butyl, n-pentyl, 2-methyl-1-pentyl, n-hexyl, n-heptyl, n-octyl, 2-ethylhexyl, 2-propylheptyl, phenyl, or cyclohexyl, o is 0 to 3, preferably 1 or 2, and p is 1 to 3, preferably 1 or 2, preferably m+n is 2.

As used hereafter, ethylene oxide capped glycol ethers of the present invention means that the ethylene oxide cap comprises 1 to 3 ethylene oxide units. Preferred ethylene oxide capped glycol ethers are the ethylene oxide capped n-butyl ether, the ethylene oxide capped n-butyl ethers of propylene glycol, the ethylene oxide capped n-butyl ethers of dipropylene glycol, the ethylene oxide capped n-butyl ethers of tripropylene glycol, the ethylene oxide capped n-pentyl ether, the ethylene oxide capped n-pentyl ethers of propylene glycol, the ethylene oxide capped n-pentyl ethers of dipropylene glycol, the ethylene oxide capped n-pentyl ethers of tripropylene glycol, the ethylene oxide capped 2-methyl-1-pentyl ether, the ethylene oxide capped 2-methyl-1-pentyl ethers of propylene glycol, the ethylene oxide capped 2-methyl-1-pentyl ethers of dipropylene glycol, the ethylene oxide capped 2-methyl-1-pentyl ethers of tripropylene glycol, the ethylene oxide capped n-hexyl ether, the ethylene oxide capped n-hexyl ethers of propylene glycol, the ethylene oxide capped n-hexyl ethers of dipropylene glycol, the ethylene oxide capped n-hexyl ethers of tripropylene glycol, the ethylene oxide capped n-heptyl ether, the ethylene oxide capped n-heptyl ethers of propylene glycol, the ethylene oxide capped n-heptyl ethers of dipropylene glycol, the ethylene oxide capped n-heptyl ethers of tripropylene glycol, the ethylene oxide capped n-octyl ether, the ethylene oxide capped n-octyl ethers of propylene glycol, the ethylene oxide capped n-octyl ethers of dipropylene glycol, the ethylene oxide capped n-octyl ethers of tripropylene glycol, the ethylene oxide capped 2-ethylhexyl ether, the ethylene oxide capped 2-ethylhexyl ethers of propylene glycol, the ethylene oxide capped 2-ethylhexyl ethers of dipropylene glycol, the ethylene oxide capped 2-ethylhexyl ethers of tripropylene glycol, the ethylene oxide capped 2-propylheptyl ether, the ethylene oxide capped 2-propylheptyl ethers of propylene glycol, the ethylene oxide capped 2-propylheptyl ethers of dipropylene glycol, the ethylene oxide capped 2-propylheptyl ethers of tripropylene glycol, the ethylene oxide capped phenyl ether, the ethylene oxide capped phenyl ethers of propylene glycol, the ethylene oxide capped phenyl ethers of dipropylene glycol, the ethylene oxide capped phenyl ethers of tripropylene glycol, the ethylene oxide capped cyclohexyl ether, the ethylene oxide capped cyclohexyl ethers of propylene glycol, the ethylene oxide capped cyclohexyl ethers of dipropylene glycol, the ethylene oxide capped cyclohexyl ethers of tripropylene glycol, or mixtures thereof.

As used hereafter, propylene oxide capped glycol ethers of the present invention means that the propylene oxide cap comprises 1 to 3 propylene oxide units. Preferred propylene oxide capped glycol ethers are the propylene oxide capped n-butyl ether, the propylene oxide capped n-butyl ethers of ethylene glycol, the propylene oxide capped n-butyl ethers of diethylene glycol, the propylene oxide capped n-butyl ethers of triethylene glycol, the propylene oxide capped n-pentyl ether, the propylene oxide capped n-pentyl ethers of ethylene glycol, the propylene oxide capped n-pentyl ethers of diethylene glycol, the propylene oxide capped n-pentyl ethers of triethylene glycol, the propylene oxide capped 2-methyl-1-pentyl ether, the propylene oxide capped 2-methyl-1-pentyl ethers of ethylene glycol, the propylene oxide capped 2-methyl-1-pentyl ethers of diethylene glycol, the propylene oxide capped 2-methyl-1-pentyl ethers of triethylene glycol, the propylene oxide capped n-hexyl ether, the propylene oxide capped n-hexyl ethers of ethylene glycol, the propylene oxide capped n-hexyl ethers of diethylene glycol, the propylene oxide capped n-hexyl ethers of triethylene glycol, the propylene oxide capped n-heptyl ether, the propylene oxide capped n-heptyl ethers of ethylene glycol, the propylene oxide capped n-heptyl ethers of diethylene glycol, the propylene oxide capped n-heptyl ethers of triethylene glycol, the propylene oxide capped n-octyl ether, the propylene oxide capped n-octyl ethers of ethylene glycol, the propylene oxide capped n-octyl ethers of diethylene glycol, the propylene oxide capped n-octyl ethers of triethylene glycol, the propylene oxide capped 2-ethylhexyl ether, the propylene oxide capped 2-ethylhexyl ethers of ethylene glycol, the propylene oxide capped 2-ethylhexyl ethers of diethylene glycol, the propylene oxide capped 2-ethylhexyl ethers of triethylene glycol, the propylene oxide capped 2-propylheptyl ether, the propylene oxide capped 2-propylheptyl ethers of ethylene glycol, the propylene oxide capped 2-propylheptyl ethers of diethylene glycol, the propylene oxide capped 2-propylheptyl ethers of triethylene glycol, the propylene oxide capped phenyl ether, the propylene oxide capped phenyl ethers of ethylene glycol, the propylene oxide capped phenyl ethers of diethylene glycol, the propylene oxide capped phenyl ethers of triethylene glycol, the propylene oxide capped cyclohexyl ether, the propylene oxide capped cyclohexyl ethers of ethylene glycol, the propylene oxide capped cyclohexyl ethers of diethylene glycol, the propylene oxide capped cyclohexyl ethers of triethylene glycol, or mixtures thereof.

The glycol ether (ii) is present in the composition of the present invention in an amount equal to or less than 90 weight percent, preferably equal to or less than 80 weight percent, preferably equal to or less than 70 weight percent, preferably equal to or less than 60 weight percent, preferably equal to or less than 50 weight percent based on the combined weights of the alkanolamine (i) and glycol ether (ii).

The glycol ether (ii) is present in the composition of the present invention in an amount equal to or greater than 10 weight percent, preferably equal to or greater than 20 weight percent, preferably equal to or greater than 30 weight percent, preferably equal to or greater than 40 weight percent, preferably equal to or greater than 50 weight percent based on the combined weights of the alkanolamine (i) and glycol ether (ii).

In one embodiment of the present invention the alkanolamine to glycol ether weight ratio is 50:50.

The alkanolamine/ethylene oxide capped glycol ether and/or propylene oxide capped glycol ether solution/oil sand slurry is typically agitated from 5 minutes to 4 hours, preferably for an hour or less. Preferably, the alkanolamine/ethylene oxide capped glycol ether and/or propylene oxide capped glycol ether solution oil sands slurry is heated to equal to or greater than 35° C., more preferably equal to or greater than 40° C., more preferably equal to or greater than 55° C., more preferably equal to or greater than 60° C. Preferably, the alkanolamine/ethylene oxide capped glycol ether and/or propylene oxide capped glycol ether solution oil sands slurry is heated to equal to or less than 100° C., more preferably equal to or less than 80° C., and more preferably equal to or less than 75° C.

As outlined herein above, the alkanolamine/ethylene oxide capped glycol ether and/or propylene oxide capped glycol ether treated slurry may be transferred to a separation tank, typically comprising a diluted detergent solution, wherein the bitumen and heavy oils are separated from the aqueous portion. The solids and the aqueous portion may be further treated to remove any additional free organic matter.

In another embodiment of the present invention, bitumen is recovered from oil sands through well production wherein the alkanolamine/ethylene oxide capped glycol ether and/or propylene oxide capped glycol ether composition as described herein above can be added to oil sands by means of in situ treatment of the oil sand deposits that are located too deep for strip mining. The two most common methods of in situ production recovery are cyclic steam stimulation (CSS) and steam-assisted gravity drainage (SAGD). CSS can utilize both vertical and horizontal wells that alternately inject steam and pump heated bitumen to the surface, forming a cycle of injection, heating, flow and extraction. SAGD utilizes pairs of horizontal wells placed one over the other within the bitumen pay zone. The upper well is used to inject steam, creating a permanent heated chamber within which the heated bitumen flows by gravity to the lower well, which extracts the bitumen. However, new technologies, such as vapor recovery extraction (VAPEX) and cold heavy oil production with sand (CHOPS) are being developed.

In one embodiment of the present invention, the improvement to the process of recovering bitumen from oil sands is the addition of the alkanolamine/ethylene oxide capped glycol ether and/or propylene oxide capped glycol ether composition during the slurry preparation stage. The sized material is added to a slurry tank with agitation and combined with the alkanolamine/ethylene oxide capped glycol ether and/or propylene oxide capped glycol ether composition. The alkanolamine/ethylene oxide capped glycol ether and/or propylene oxide capped glycol ether composition may be added to the oil sands slurry neat or as an aqueous solution having a concentration of from 0.01 to 10 weight percent ethylene oxide capped glycol ether and/or propylene oxide capped glycol ether based on the total weight of the alkanolamine/ethylene oxide capped glycol ether composition solution. Preferably, the ethylene oxide capped glycol ether and/or propylene oxide capped glycol ether is present in the aqueous oil sands slurry in an amount of from 0.01 to 10 weight percent based on the weight of the oil sands.

The basic steps in the in situ treatment to recover bitumen from oil sands includes: steam injection into a well, recovery of bitumen from the well, and dilution of the recovered bitumen, for example with condensate, for shipping by pipelines.

In accordance with this method, the alkanolamine/ethylene oxide capped glycol ether and/or propylene oxide capped glycol ether composition is used as a steam additive in a bitumen recovery process from a subterranean oil sand reservoir. The mode of steam injection may include one or more of steam drive, steam soak, or cyclic steam injection in a single or multi-well program. Water flooding may be used in addition to one or more of the steam injection methods listed herein above.

Typically, the steam is injected into an oil sands reservoir through an injection well, and wherein formation fluids, comprising reservoir and injection fluids, are produced either through an adjacent production well or by back flowing into the injection well.

In most oil sand reservoirs, a steam temperature of at least 180° C., which corresponds to a pressure of 150 psi (1.0 MPa), or greater is needed to mobilize the bitumen. Preferably, the alkanolamine/ethylene oxide capped glycol ether and/or propylene oxide capped glycol ether composition-steam injection stream is introduced to the reservoir at a temperature in the range of from 150° C. to 300° C., preferably 180° C. to 260° C. The particular steam temperature and pressure used in the process of the present invention will depend on such specific reservoir characteristics as depth, overburden pressure, pay zone thickness, and bitumen viscosity, and thus will be worked out for each reservoir.

It is preferable to inject the alkanolamine/ethylene oxide capped glycol ether and/or propylene oxide capped glycol ether composition simultaneously with the steam in order to ensure or maximize the amount of ethylene oxide capped glycol ether and/or propylene oxide capped glycol ether actually moving with the steam. In some instances, it may be desirable to precede or follow a steam-alkanolamine/ethylene oxide capped glycol ether and/or propylene oxide capped glycol ether composition injection stream with a steam-only injection stream. In this case, the steam temperature can be raised above 260° C. during the steam-only injection. The term "steam" used herein is meant to include superheated steam, saturated steam, and less than 100 percent quality steam.

For purposes of clarity, the term "less than 100 percent quality steam" refers to steam having a liquid water phase present. Steam quality is defined as the weight percent of dry steam contained in a unit weight of a steam-liquid mixture. "Saturated steam" is used synonymously with "100 percent quality steam". "Superheated steam" is steam which has been heated above the vapor-liquid equilibrium point. If super-heated steam is used, the steam is preferably superheated to between 5 to 50° C. above the vapor-liquid equilibrium temperature, prior to adding the alkanolamine/ethylene oxide capped glycol ether and/or propylene oxide capped glycol ether composition.

The alkanolamine/ethylene oxide capped glycol ether and/or propylene oxide capped glycol ether composition may be added to the steam neat or as a concentrate. If added as a concentrate, it may be added as a 1 to 99 weight percent solution in water. Preferably, the alkanolamine/ethylene oxide capped glycol ether and/or propylene oxide capped glycol ether composition is substantially volatilized and carried into the reservoir as an aerosol or mist. Here again, the rationale is to maximize the amount of alkanolamine and/or ethylene oxide capped glycol ether and/or propylene oxide capped glycol ether traveling with the steam into the reservoir.

The alkanolamine/ethylene oxide capped glycol ether and/or propylene oxide capped glycol ether composition is preferably injected intermittently or continuously with the steam, so that the steam-alkanolamine/ethylene oxide capped glycol ether and/or propylene oxide capped glycol ether composition injection stream reaches the downhole formation through common tubing. The rate of alkanolamine/ethylene oxide capped glycol ether and/or propylene oxide capped glycol ether composition addition is adjusted so as to maintain the preferred ethylene oxide capped glycol ether and/or propylene oxide capped glycol ether concentration of 0.01 to 10 weight percent in steam. The rate of steam injection for a typical oil sands reservoir might be on the order of enough steam to provide an advance through the formation of from 1 to 3 feet/day.

An effective SAGD additive must satisfy many requirements to be considered as successful. The major criteria of a successful additive is the ability of the additive to travel with steam and reach unrecovered in-situ bitumen in reservoir formation, favorably interact with water/bitumen/rock to enhance bitumen recovery, and not adversely interfere with existing operations. Among the three, the requirement of an additive to vaporize at SAGD operating temperatures and travel with steam limits the choice and consideration of different chemistries in SAGD technology. For example, many high molecular weight surfactants even though are known to help enhance oil recovery are not considered as SAGD additives due to their inability to travel with steam owing to high boiling point. However, many ethylene oxide capped glycol ethers and/or propylene oxide capped glycol ethers which have high boiling point than water are an exception to this. Phase equilibrium studies have shown favorable partitioning of this class of materials in vapor (i.e., steam) compared to that in liquid (i.e., water) phase. The unique ability to partition more in vapor arises from the ability of many ethylene oxide capped glycol ethers and/or propylene oxide capped glycol ethers to form water-additive azeotrope especially when present at low concentration and thereby many including those mentioned in this embodiment can travel with steam.

Examples

For Examples 1 to 12, a synthetic oil sands core is suspended on the lid of a pressure vessel, FIG. 1. The core is 1.5 inch in diameter and 6 inch in height with a 0.5 inch diameter cold finger at the center. The porosity of the synthetic core is 32 to 34% and has 15 to 18% water saturation (of pore volume). Each synthetic core contains about 36 to 40 g of bitumen. 400 mL of a solution comprising an alkanolamine and/or a glycol ether is loaded at the bottom of the vessel. In Table 1, butyl CELLOSOLVE™ is a glycol ether represented by formula II wherein R is butyl, m=0, and n=1, and is available from The Dow Chemical Company. A glass cup is placed under the synthetic core to collect the bitumen and condensed water. The vessel is heated at 225° C. for 3 hours. Water flows through the cold finger throughout the experiment. The amount of bitumen extracted and the bitumen remaining in the synthetic core are measured by extracting bitumen into toluene and evaporating the toluene in a vacuum oven. The % recovery of bitumen with various additive solution is summarized in Table 1.

TABLE 1

| Ex | Additive | Recovery |
|---|---|---|
| 1* | Baseline (no alkanolamine and/or a glycol ether) | 52% |
| 2* | 2000 ppm Butyl CELLOSOLVE | 54% |
| 3* | 2000 ppm 3-Amino-1-propanol | 46% |
| 4 | 1000 ppm 3-Amino-1-propanol + 1000 ppm Butyl CELLOSOLVE | 63% |
| 5 | 500 ppm 3-Amino-1-propanol + 1500 ppm Butyl CELLOSOLVE | 59% |
| 6* | 2000 ppm Monoisopropanol | 54% |
| 7 | 1000 ppm Monoisopropanol + 1000 ppm Butyl CELLOSOLVE | 59% |
| 8 | 1000 ppm Monoethanolamine + 1000 ppm Butyl CELLOSOLVE | 61% |
| 9* | 2000 ppm N-methylmonoethanolamine | 48% |
| 10 | 1000 ppm N-methylmonoethanolamine + 1000 ppm Butyl CELLOSOLVE | 68% |
| 11* | 2000 ppm N,N-diethylmonoethanolamine | 58% |
| 12 | 1000 ppm N,N-diethylmonoethanolamine + 1000 ppm Butyl CELLOSOLVE | 57% |

*Not an example of the invention

What is claimed is:

1. A method to recover bitumen comprising the step of contacting oil sands with a composition consisting essentially of an alkanolamine and a glycol ether wherein the alkanolamine/glycol ether composition comprises:
    (i) an alkanolamine described by the following structure:

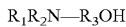
    $R_1R_2N—R_3OH$ where $R_1$ is H, or a linear, branched, or cyclic alkyl group of 1 to 4 carbons, $R_2$ is H, —$CH_2CH_2OH$, or a linear, branched, or cyclic alkyl group of 1 to 4 carbons,
    and
    $R_3$ is a linear or branched alkyl group of 2 to 5 carbons
    and
    (ii) one or more glycol ether selected from:
        (a) an ethylene oxide capped glycol ether described by the following structure:

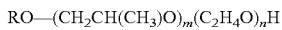
        $RO—(CH_2CH(CH_3)O)_m(C_2H_4O)_nH$ wherein R is a linear, branched, cyclic alkyl, phenyl, or alkyl phenyl group of equal to or greater than 4 carbons,
        m is 0 to 3,
        and
        n is 1 to 3,
        and
        (b) a propylene oxide capped glycol ether described by the following structure:

        $RO—(C_2H_4O)_o(CH_2CH(CH_3)O)_pH$ wherein R is a linear, branched, cyclic alkyl, phenyl, or alkyl phenyl group of equal to or greater than 4 carbons,
        o is 0 to 3,
        and
        p is 1 to 3,
wherein the treatment is to oil sands recovered by surface mining or in situ production and the ratio of alkanolamine (i) to ethylene oxide capped glycol ether and/or propylene oxide capped glycol ether (ii) is from 25:75 to 75:25.

2. The method of claim 1 comprising the steps of:
    i) surface mining oil sands,
    ii) preparing an aqueous slurry of the oil sands,
    iii) treating the aqueous slurry with the alkanolamine/ethylene oxide capped glycol ether and/or propylene oxide capped glycol ether composition,
    iv) agitating the treated aqueous slurry,
    v) transferring the agitated treated aqueous slurry to a separation tank,
    and
    vi) separating the bitumen from the aqueous portion.

3. The method of claim 2 wherein the ethylene oxide capped glycol ether and/or propylene capped glycol ether is present in the aqueous slurry in an amount of from 0.01 to 10 weight percent based on the weight of the oil sands.

4. The method of claim 1 by in situ production comprising the steps of:
    i) treating a subterranean reservoir of oil sands by injecting steam containing the alkanolamine/ethylene oxide capped glycol ether and/or propylene capped glycol ether composition into a well,
    and
    ii) recovering the bitumen from the well.

5. The method of claim 1 wherein the ratio of alkanolamine (i) to ethylene oxide capped glycol ether and/or propylene oxide capped glycol ether (ii) is around 50:50.

6. The method of claim 4 wherein the concentration of the ethylene oxide capped glycol ether and/or propylene oxide capped glycol ether in the steam is in an amount of from 0.01 to 10 weight percent.

7. The method of claim 1 wherein the alkanolamine is monoethanolamine, monoisopropanolamine, N-methymonoethanolamine, 3-amino-1-propanol, or mixtures thereof.

8. The method of claim 1 wherein the ethylene oxide capped glycol ether is ethylene oxide capped n-butyl ether, ethylene oxide capped n-butyl ether of propylene glycol, ethylene oxide capped n-hexyl ether, ethylene oxide capped n-hexyl ether of propylene glycol, ethylene oxide capped 2-ethylhexyl ether, or ethylene oxide capped 2-ethylhexyl ether of propylene glycol.

9. The method of claim 1 wherein the propylene oxide capped glycol ether is propylene oxide capped n-butyl ether, propylene oxide capped n-butyl ether of ethylene glycol, propylene oxide capped n-hexyl ether, propylene oxide capped n-hexyl ether of ethylene glycol, propylene oxide capped 2-ethylhexyl ether, or propylene oxide capped 2-ethylhexyl ether of ethylene glycol.

10. The method of claim 1 wherein the alkanolamine is monoethanolamine, monoisopropanolamine, N-methymonoethanolamine, 3-amino-1-propanol, or mixtures thereof and the ethylene oxide capped glycol ether is ethylene oxide capped n-butyl ether, ethylene oxide capped n-butyl ether of propylene glycol, ethylene oxide capped n-hexyl ether, ethylene oxide capped n-hexyl ether of propylene glycol, ethylene oxide capped 2-ethylhexyl ether, or ethylene oxide capped 2-ethylhexyl ether of propylene glycol.

* * * * *